March 5, 1968  E. MATHIS  3,371,721
ROTARY SPADE PLOW
Filed April 5, 1965  2 Sheets-Sheet 1
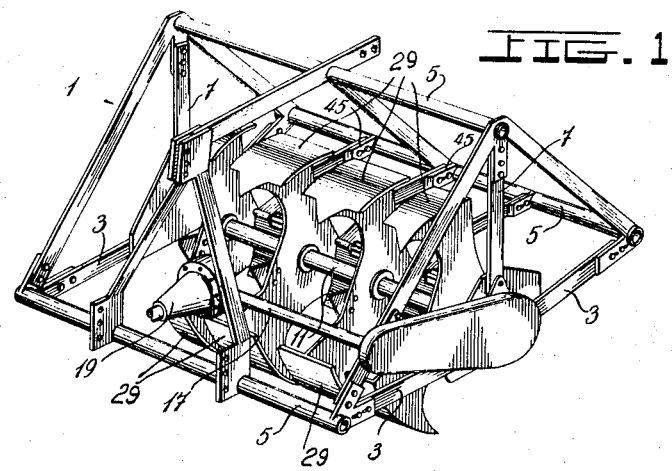
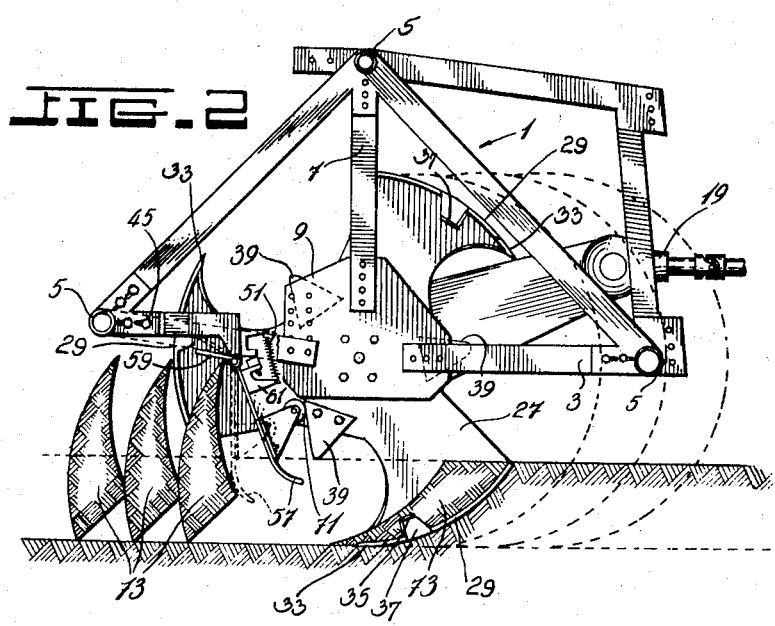
INVENTOR
Edmond MATHIS
BY
ATTORNEYS March 5, 1968  E. MATHIS  3,371,721
ROTARY SPADE PLOW Filed April 5, 1965 2 Sheets-Sheet 2

INVENTOR
Edmond MATHIS
BY
ATTORNEYS

United States Patent Office 3,371,721
Patented Mar. 5, 1968

3,371,721
ROTARY SPADE PLOW
Edmond Mathis, 3625 Laurier St. E., Apt. 2,
Montreal, Quebec, Canada
Filed Apr. 5, 1965, Ser. No. 445,517
6 Claims. (Cl. 172—112)

ABSTRACT OF THE DISCLOSURE

A rotary spade plough formed of a frame on which is rotatably mounted a spade-equipped wheel having a plurality of radial arms at the outer end of each one of which a spade is provided having a cutting leading edge adapted to come into engagement with the soil as the wheel rotates. Between each two arms and inwardly of the spades is a pivotable shoe mounted at the rearward end of the frame. Cams mounted on the radial arms between successive spades pivot the shoe outwardly, as the wheel rotates, to pack successive soil lumps cut by the spades.

The instant invention relates to a machine for ploughing the soil or carry out similar soil working operations and is of the type to be drawn by a motor vehicle such as a tractor.

Ploughing has heretofore been done by dragging a ploughshare through the soil. This method has several disadvantages such as requiring a substantial consumption of power. Another very obvious disadvantage results from the fact that the lumps of soil, and this is particularly so in certain types of soil such as heavy clay, are deposited in long strips rather than being cut into smaller pieces. Also, because of the heavy resistance met by the ploughshare, the drawing vehicle often tends to slide over the soil, and again this is particularly so in clay soils.

It is therefore a main object of the invention to avoid the above noted disadvantages and more specifically by providing a plough which, by its construction, will tend to considerably reduce the power consumption normally required in the conventional types of ploughshare.

Another object of the invention resides in the provision of a novel plough wherein the soil is chopped into small pieces or lumps extending transversely of the direction of displacement of the plough.

The above advantages and objects may be derived from a plough made according to the invention which is of the rotary spade type and comprises: a frame adapted to be displaced over the ground surface in a predetermined direction; a spade-equipped wheel structure mounted for rotation in said frame and including a central rotatable axle mounted in the frame to extend transversely of the predetermined direction of displacement, and a plurality of satellite blades mounted to rotate around the central axle and at equal distances therefrom; said spades each having a leading edge, parallel to said axle, coming into cutting engagement with the soil as the frame is displaced thereover. In order to reduce the cutting resistance of the ploughshare during its rotation, the wheel structure is provided with driving means which will cause rotation thereof as the frame is displaced over the ground, the wheel structure rotating in the direction corresponding to said predetermined direction.

In the preferred form of the invention, the wheel structure comprises a plurality of radial arms fixed to the axle; the said arms being arranged in groups spaced along the axle with the arms of the groups spread around the axle and lying substantially in a plane normal thereto; a generally downwardly directed shoe pivotally mounted at the upper end of the frame, rearwardly thereof in relation to the predetermined direction above-mentioned, between each group of arms and inwardly of the blades; a cam mounted on the axle for rotation therewith, forwardly of each shoe and between each two successive arms, said cams being adapted to contact said shoes and thereby cause pivoting thereof whereby to pack successive soil lumps, cut by said blades, against one another as they are released from the spades during rotation of the wheel structure.

Again, in the preferred embodiment of the invention, the means to drive the wheel structure into rotation is a power transmission coupled to a power take-off of the tractor and to the axle.

A better understanding of the invention will now be afforded by the description that follows of a preferred embodiment of the invention having reference to the appended drawing wherein:

FIG. 1 is a perspective view of the rotary spade plough unit made according to the invention;

FIG. 2 is a side-elevation view, with a frameside member taken away to illustrate the packing shoe structure;

Figure 3:
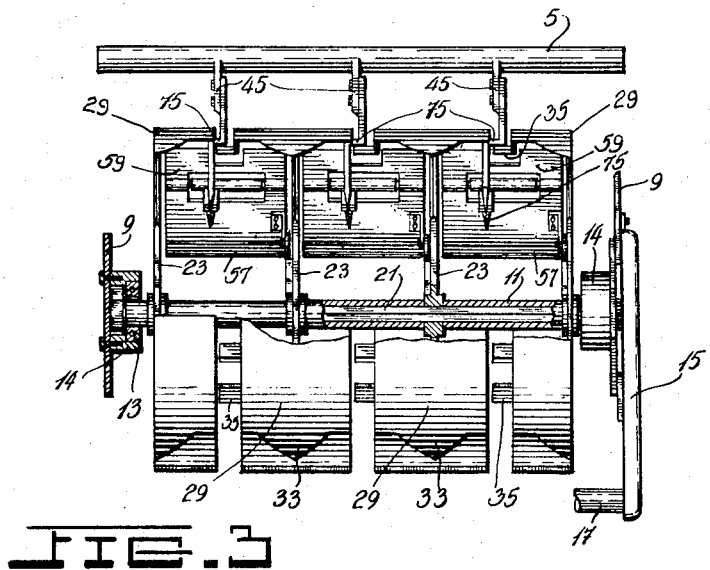
FIG. 3 is a partial front elevation view of the plough of the invention with certain parts shown in cross-section to illustrate the inner structure thereof.

As illustrated in FIG. 1, the rotary spade plough of the invention comprises a frame formed of two lateral triangular trusses 1 joined, at the apices thereof, by three cross beams 5. As best seen in FIG. 2, the lower members 3 of trusses 1 as well as each vertical brace 7 are connected to gusset plates 9.

Between gusset plates 9 is rotatably mounted a hollow shaft 11 the particular features and connections of which to the gusset plates are best illustrated in FIG. 3. From this figure it will be noted that the outer ends of shaft 11 are received in bearings 13 mounted in journals 14 secured to the gusset plates 9 with the rightward end (FIG. 3) of the shaft in operative coupling with one end of a transmission 15, the other end of which is operatively mounted on a shaft 17 adapted to be connected to a power take-off 19 (FIG. 1) of a tractor, not shown. It will readily be understood from this description that axle 11 is driven from the engine of the tractor.

As said previously, axle 11 is hollow and a square axle 21 is mounted therein for rotation therewith.

Figures 4, 5:
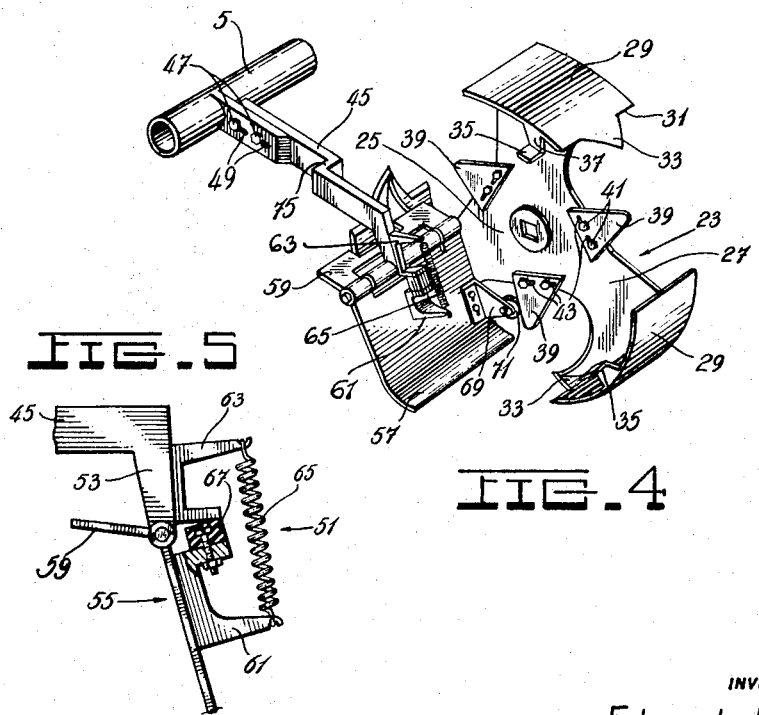
FIG. 4 is a perspective view of the packing shoe structure.
FIG. 5 is a partial side elevation view of the packing shoe structure.

Spaced along square axle 21 are securely mounted a plurality of spade supports 23 each formed of a central annulus 25 having a series of spokes or arms 27 radially projecting therefrom as clearly illustrated in FIG. 4. Actually, arms 27 are integral with and merge, at their inner end, with annulus 25.

At the outer end of arms 27 are fixed, centrally on each arm, a spade 29 which is a generally curved plate having a leading edge 31 adapted to come into cutting engagement with the soil, as will later be explained. Preferably, the leading edges are provided with central pointed projections 33 adapted to ease in opening up the soil.

Connected to a lateral edge of each spade 29 and inwardly thereof is a root cutting knife 35 held inwardly spaced from the outer surface of spade 29 by a bracket 37.

On the annulus 25 and between each pair of arms 27 are secured generally triangular cams 39 which are preferably adjustably mounted on the said annulus by means of bolts 41 movable into elongated slots 43.

Reverting to FIGS. 2 and 3, it will be noted that there is provided between each two supports 23 and the spades 29 mounted thereon, a bar 45 rigidly and removably fastened to the rearward lower cross beam 5. The connection is again preferably through a set of bolts 47 engageable into elongated slots 49 whereby bars 45 may be adjusted in relation to cross beam 5.

It will be noted that bar 45 is formed of two offset parts separated as at 75. This is provided in order to allow free travel of knives 35 standing to gap the space between the spades 29 of two consecutive supports 23. The condition is best illustrated in FIG. 3.

Coming back again to FIGS. 4 and 5, a packing shoe structure generally denoted by numeral 51 is mounted at the end of lever 45, the latter being provided with a downward projection 53 at the end of which is pivotally mounted the shoe proper, referred to by numeral 55.

The said shoe is formed of a downwardly projecting portion 57 and a balancing portion 59: shoe 55 being pivoted intermediate the said portions 57 and 59.

Forwardly of downward portion 57, that is in the direction of the power take off, is a bracket 61 while a second bracket 63 is secured on the forward face of projection 53. A coil spring 65 is fixed between the outer ends of brackets 61 and 63 whereby shoe 55 is normally biased upwardly. For this purpose, a rubber pad 67 is provided on the other end of bracket 61 to abut the downward end of bracket 63 as it is intended to swiftly bring shoe 55 back to its normal upward position after its operation is terminated.

A pushing member 69 (FIG. 4) is mounted along one lateral edge of the downward portion 57 of shoe 55, the said pushing member having a roller 71 at the outer free end thereof adapted to come in contact with cams 39.

The operation of the rotary spade plow of the invention is as follows.

As soon as the tractor engine turns and power take off 19 is rendered operative, the wheel structure, formed of axles 11, 21, supports 23 and spades 29 start rotating in the direction corresponding to the direction of displacement of the frame whereby to bring spades 29 into cutting engagement with the soil to therefore chop it off into somewhat triangular lumps 73. During the plough's rotation, lumps 73 are brought rearwardly, as illustrated in FIG. 2, reversed and finally made to stand upright as they slide off the inner surface of spade 29. As soon as lumps 73 start to be released from the spade, the packing shoe structure gets into action whereby cams 39 press on the downward portion 57 of shoes 55 to force the latter against the lumps that are coming off the corresponding spades and pack the said lumps against the previously formed lumps. In some cases, the packing shoe serves to release the lumps. The result is generally that shown in FIG. 2. It will be particularly noted that a generally triangular space is left between the lower ends of successive lumps 73 wherein air is trapped thus helping in the decomposition of the roots and other similar vegetative detritous lying in the said space.

It will of course be understood that a hydraulic jack may be provided on the tractor for lifting the said plough frame whenever the plough is not in use.

As mentioned above, the digging action of the rotary plough in the ground considerably reduces the traction power that has to be developed by the tractor whereby this type of plough may be used in slippery clay soils as well as upward of slopes where conventionally equipped tractors could not work heretofore.

Although a specific embodiment has just been described, it will be understood that various modifications may be made thereto without departing from the spirit of the invention, the scope of which is set out in the appended claims.

I claim:
1. A rotary spade plough for cultivating the soil, comprising:
   (a) a frame adapted to be displaced over the ground surface in a predetermined direction;
   (b) a spade-equipped wheel structure mounted for rotation in said frame and including:
      a central rotatable axle mounted in said frame to extend transversely of said predetermined direction of displacement;
      a plurality of spaced radial arms secured on said axle;
      a spade secured at the outer end of each arm and having a leading edge adapted to come into cutting engagement with the soil as said frame is displaced thereover;
   (c) cooperating means rearwardly of said frame and on said arms, inwardly of said spades, for packing successive soil lumps, cut by said spades, one against the other as they are released from the spades during rotation of said wheel structure, and
   (d) driving means for rotating said wheel structure in the direction corresponding to said predetermined direction.

2. A plough as claimed in claim 1 wherein each spade is provided, on one side thereof, with a root cutting knife extending in the direction of the adjoining spade; said knives being provided to ensure the cutting of roots between spades of adjoining supports.

3. A rotary spade plough for cultivating the soil, comprising:
   (a) a frame adapted to be displaced over the ground surface in a predetermined direction;
   (b) a spade-equipped wheel structure mounted for rotation in said frame and including:
      a central rotatable axle mounted in said frame to extend transversely of said predetermined direction of displacement;
      a plurality of radial arms fixed to said axle; said arms being arranged in groups spaced along said axle with the arms of a group spread around said axle and lying substantially in a plane normal to said axle;
      a spade secured at the outer end of each arm and having a leading edge adapted to come into cutting engagement with the soil as said frame is displaced thereover;
   (c) a generally downwardly directed shoe pivotally mounted at the upper end on said frame, rearwardly thereof in relation to said predetermined direction, between each group of arms and inwardly of said spades;
   (d) a cam mounted on said axle for rotation therewith, forwardly of each shoe and between each two successive arms; said cams adapted to contact said shoes and cause pivoting thereof whereby to pack successive soil lumps, cut by said spades, against one another as they are released from the spades during rotation of said wheel structure, and
   (e) driving means for rotating said wheel structure in the direction corresponding to said predetermined direction.

4. A plough as claimed in claim 3 to be drawn by a tractor having a power take-off, said driving means including a power transmisison coupled to said power take-off and to said axle.

5. A plough as claimed in claim 3, wherein the arms of each group are radial spokes projecting from a central annulus secured to said axle; said cams being fastened on said annulus between each two arms.

6. A plough as claimed in claim 3, wherein said shoes are spring-biased toward said cams.

References Cited
FOREIGN PATENTS
921,172 4/1947 France.
632,687 10/1934 Germany.
891,116 3/1962 Great Britain.

ABRAHAM G. STONE, *Primary Examiner.*

J. R. OAKS, *Assistant Examiner.*